US012257589B2

(12) United States Patent
Kolekar

(10) Patent No.: US 12,257,589 B2
(45) Date of Patent: Mar. 25, 2025

(54) FLUIDIC OSCILLATOR

(71) Applicant: AS America, Inc., Piscataway, NJ (US)

(72) Inventor: Nitin S. Kolekar, Hillsborough, NJ (US)

(73) Assignee: AS America, Inc., Piscataway, NJ (US)

( * ) Notice: Subject to any disclaimer, the term of this patent is extended or adjusted under 35 U.S.C. 154(b) by 328 days.

(21) Appl. No.: 17/640,046

(22) PCT Filed: Sep. 15, 2020

(86) PCT No.: PCT/US2020/050801
§ 371 (c)(1),
(2) Date: Mar. 3, 2022

(87) PCT Pub. No.: WO2021/055309
PCT Pub. Date: Mar. 25, 2021

(65) Prior Publication Data

US 2022/0339644 A1 Oct. 27, 2022

Related U.S. Application Data

(60) Provisional application No. 62/900,745, filed on Sep. 16, 2019.

(51) Int. Cl.
*B05B 1/08* (2006.01)
*B05B 1/18* (2006.01)

(52) U.S. Cl.
CPC . *B05B 1/08* (2013.01); *B05B 1/18* (2013.01)

(58) Field of Classification Search
CPC .................................... B05B 1/08; B05B 1/18
See application file for complete search history.

(56) References Cited

U.S. PATENT DOCUMENTS

| | | | |
|---|---|---|---|
| 7,014,131 B2 | 3/2006 | Berning et al. | |
| 7,111,800 B2 | 9/2006 | Berning et al. | |
| 2010/0072307 A1* | 3/2010 | Hester | B05B 1/08 239/589.1 |
| 2016/0339457 A1 | 11/2016 | Hou | |

FOREIGN PATENT DOCUMENTS

WO 2018197231 A1 11/2018

OTHER PUBLICATIONS

"Phase-Synchronized Fluidic Oscillator Pair" (Tomac et al), Nov. 26, 2018, [online] retrieved from USPTO file wrapper of PCT Application PCT/US2020/05080.
International Search Report mailed Dec. 17, 2020 in corresponding International Application No. PCT/US2020/050801 (2 pages).

* cited by examiner

*Primary Examiner* — Qingzhang Zhou
(74) *Attorney, Agent, or Firm* — Tyler A. Stevenson; Anna-Lisa L. Gallo

(57) ABSTRACT

A fluidic oscillator, comprising an oscillator body comprising an exterior surface; an interior surface defining a three-dimensional space therein; a fluid inlet; and a fluid outlet, wherein the three-dimensional space, the fluid inlet, and the fluid outlet are in flow communication, the three-dimensional space comprises a first fluid interaction region fluidly coupled to a first pair of feedback flow paths, and a second fluid interaction region fluidly coupled to a second pair of feedback flow paths, and wherein the first and second fluid interaction regions intersect.

20 Claims, 4 Drawing Sheets

FLUIDIC OSCILLATOR

The disclosure is related to fluidic oscillators and to plumbing fixtures comprising fluidic oscillators. In some embodiments, the fluidic oscillators are passive 3D oscillators.

BACKGROUND

Shower heads generally comprise a plurality of small annular nozzles designed to wet a certain area and to provide a pleasant shower experience. In order to achieve a desired effect, a large number of nozzles are employed and a large of amount of water is consumed.

Needed is a water-saving shower head capable of delivering water to a specified area while at the same time providing a pleasant shower experience with a desired cleaning and rinsing effect.

SUMMARY

Accordingly, disclosed is a fluidic oscillator, comprising an oscillator body comprising an exterior surface; an interior surface defining a three-dimensional space therein; a fluid inlet; and a fluid outlet, wherein the three-dimensional space, the fluid inlet, and the fluid outlet are in flow communication, the three-dimensional space comprises a first fluid interaction region adjacent a first pair of feedback flow paths, and a second fluid interaction region adjacent a second pair of feedback flow paths, and wherein the first and second fluid interaction regions intersect to provide flow communication throughout the three-dimensional space.

Also disclosed is a plumbing fixture comprising one or more fluidic oscillators according to the invention.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1A:
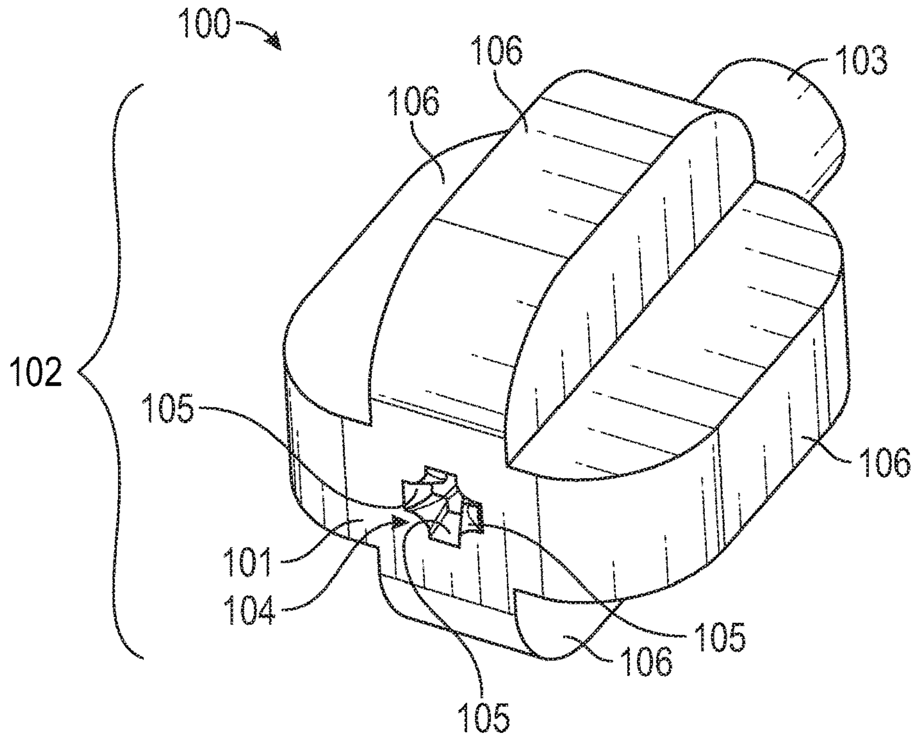
FIG. 1A shows a perspective view of a fluidic oscillator, according to an embodiment.

FIG. 1A shows fluidic oscillator 100, according to an embodiment. Visible is an exterior surface of oscillator body 102. Shown is planar face 101 on a downstream end of oscillator body 102. Planar face 101 is flush with outlet 104. Conduit 103 is coupled to an upstream end of body 102. Outlet 104 contains outwardly flared walls 105. Fluidic oscillator 100 comprises exterior walls (or fins) 106. Walls 106 are disposed about 90 degrees from each other. Fluid is configured to enter fluidic oscillator at an upstream end through conduit 103 and exit at downstream end through outlet 104.

Figure 1B:
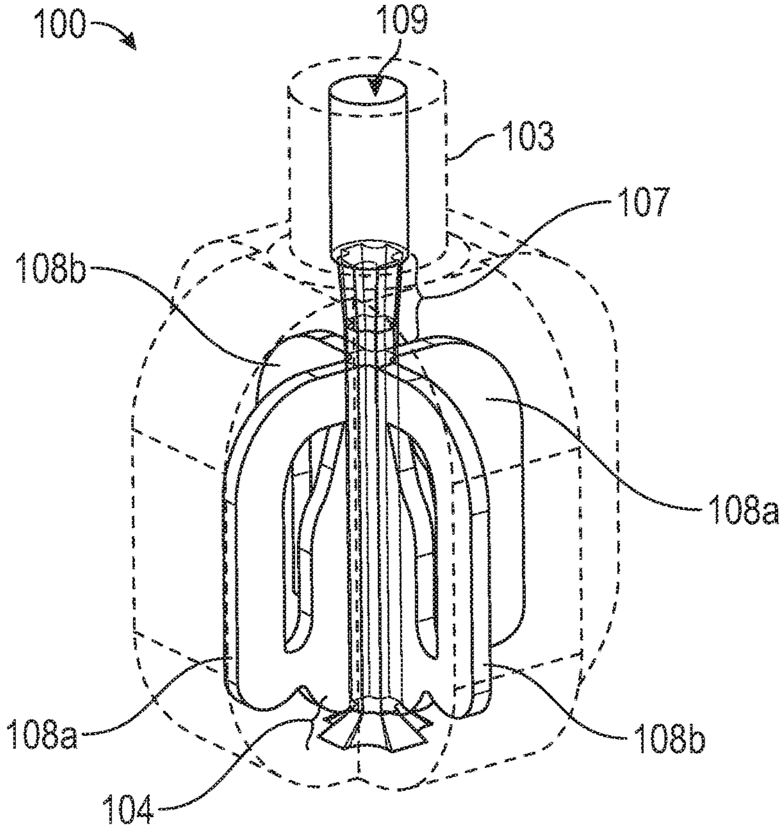
FIG. 1B shows a see-through view of a fluidic oscillator, according to an embodiment.

FIG. 1B provides a see-through view of fluidic oscillator 100, according to an embodiment. Visible is conduit 103 upstream of and in fluid communication with fluid inlet 107. Inlet 107 is in flow communication with outlet 104. Also visible are feedback flow paths 108*a* and 108*b*. Feedback flow paths 108*a* constitute a pair and are positioned about 180 degrees apart. Likewise, feedback flow paths 108*b* are another pair and are positioned about 180 degrees apart. Conduit 103 comprises a substantially cylindrical bore 109. In this embodiment, feedback flow paths 108 are disposed about 90 degrees apart.

Figure 1C:
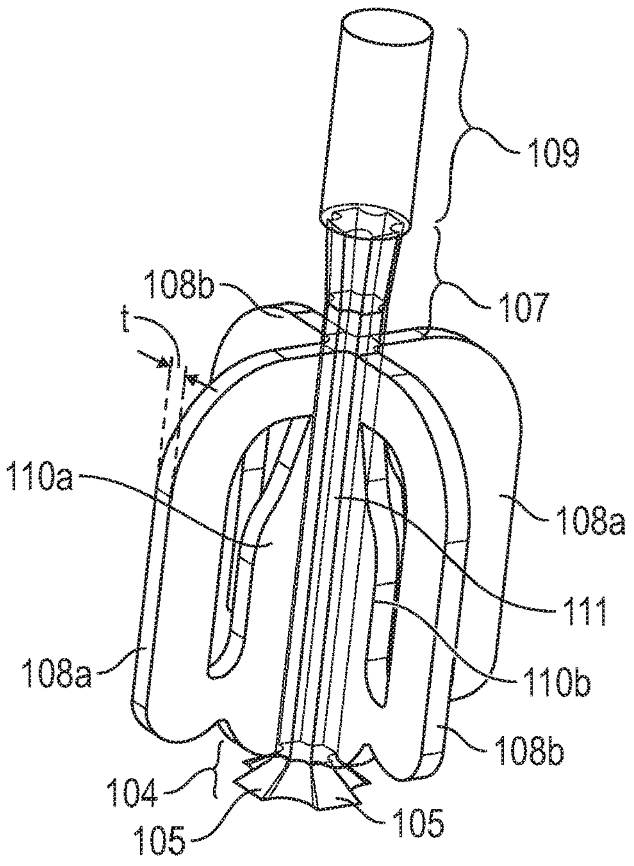
FIG. 1C shows a view of an internal three-dimensional space of a fluidic oscillator, according to an embodiment.

FIG. 1C shows a see-through view of the interior surface defining the internal three-dimensional space of fluidic oscillator 100, according to an embodiment. Visible are conduit bore 109, fluid inlet 107, and fluid outlet 104. Fluid inlet 107 is inwardly (downwardly) tapered. Fluid outlet 104 comprises outwardly flared walls 105. Feedback flow paths (feedback loops) 108*a* and 108*b* are disposed about 90 degrees apart from each other. A first pair of feedback flow paths 108*a* are coupled to a first fluid interaction area 110*a*. Second pair of feedback flow paths 108*b* are coupled to second fluid interaction area 110*b*. First fluid interaction area 110*a* and second fluid interaction area 110*b* intersect. Intersection of fluid interaction areas provides a central bore 111 through body 102 of fluidic oscillator 100. The internal space is in flow communication throughout. A thickness t of a feedback flow path 108*a* or 108*b* is about 1.5 mm in this embodiment.

Figure 1D:
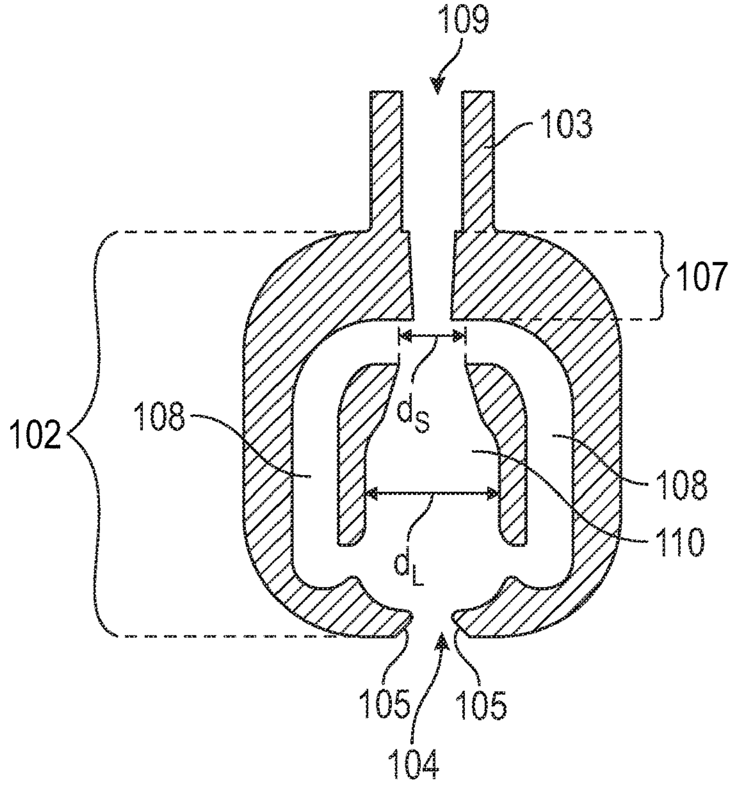
FIG. 1D shows a cross-section view of a fluidic oscillator, according to an embodiment.

FIG. 1D shows a cross-section view of fluidic oscillator 100, according to an embodiment. Shown are conduit 103 comprising bore 109, inwardly tapered fluid inlet 107, fluid outlet 104 having outwardly flared walls 105, and a pair of feedback flow paths 108 coupled to fluid interaction area 110. In this embodiment, body 102 has a largest diameter (or width) of about 32.1 mm; bore 109 has a diameter of about 5.2 mm and conduit 103 has an outer diameter of about 10.4 mm; fluid inlet 107 has a largest diameter of about 4.0 mm; fluid outlet 104 has a largest diameter of about 6.1 mm and a smallest diameter of about 3.9 mm; and fluid interaction area 110 has a central largest measure $d_L$ of about 11.6 mm and a smallest measure ds of about 5.7 mm.

Figure 2:
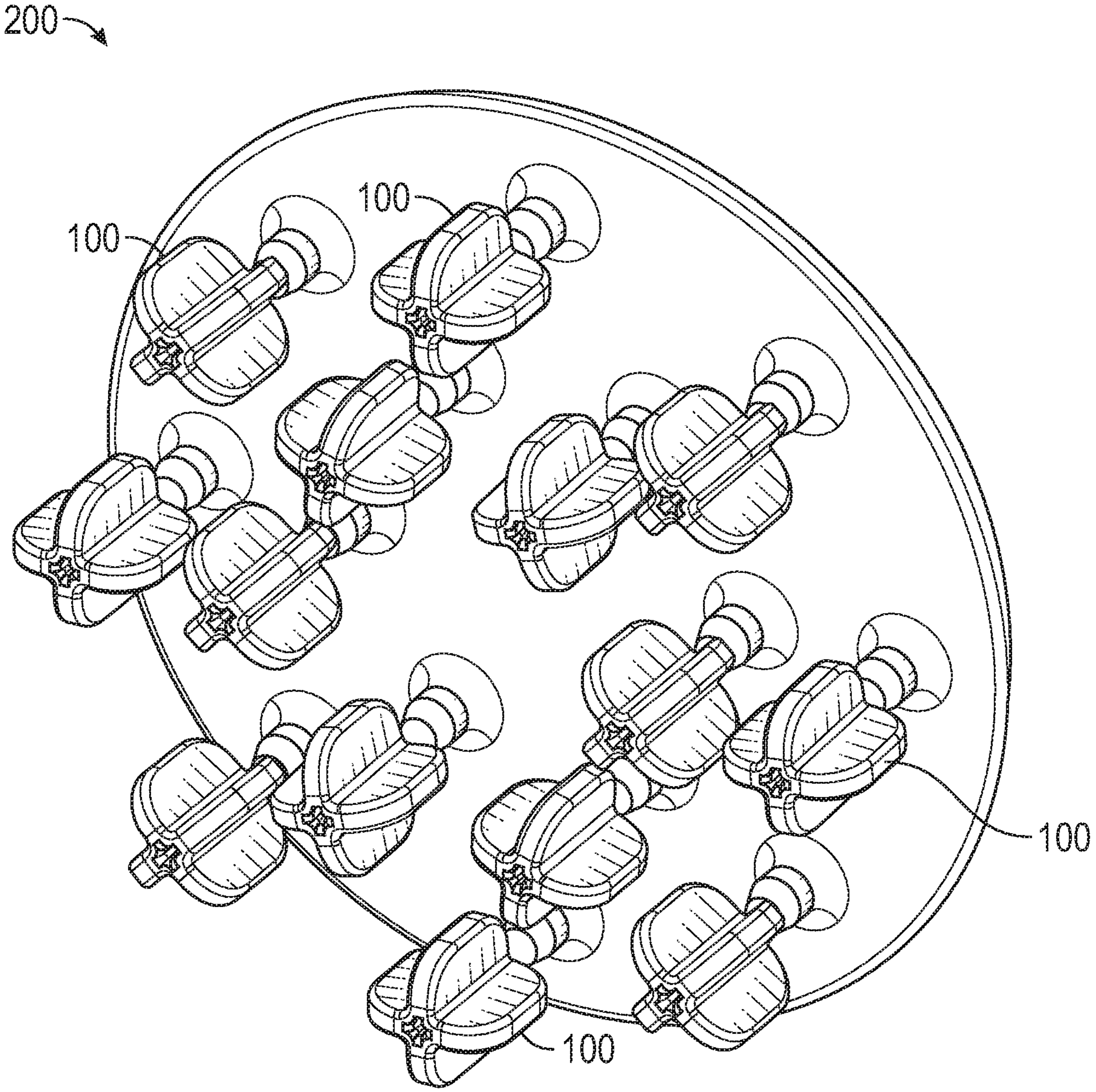
FIG. 2 shows a shower head comprising a plurality of fluidic oscillators, according to an embodiment.

FIG. 2 depicts a shower head 200 comprising a plurality of fluidic oscillators 100, according to an embodiment. Fluidic oscillators 100 are randomly oriented with respect to positioning of oscillator body walls (and thereby feedback flow paths). Fluidic oscillators 100 are oriented in a regular pattern with respect to each other.

In some embodiments, a fluidic oscillator comprises an oscillator body having a continuous exterior surface and a continuous interior surface defining a three-dimensional space. The three-dimensional space includes fluid flow pathways configured to encourage and to provide for fluid oscillating spray. The oscillator body includes a fluid inlet and a fluid outlet. The fluid inlet, fluid outlet, and three-dimensional space within the body are in flow communication.

In some embodiments, the three-dimensional space includes a first fluid interaction area coupled to a first pair of fluid feedback flow paths, or fluid feedback loops; and a second fluid interaction area coupled to a second pair of fluid feedback flow paths; and wherein the first and second fluid interaction areas intersect. In some embodiments, the area of intersection provides a substantially cylinder-shaped bore from inlet to outlet. In other embodiments, the area of intersection may take on other three-dimensional shapes.

In some embodiments, an exterior surface of an oscillator body may have any shape, for instance a smooth spherical shape, a "football" type shape, spheroid shape, prolate spheroid, or a shape having walls, edges, and/or points. An oscillator body shape may be symmetrical or non-symmetrical. In some embodiments, an oscillator body shape may comprise walls, wherein the walls correspond to fluid feedback pathways disposed therein. In some embodiments, body walls may be substantially evenly spaced, for instance wherein four walls form a cross shape. In other embodiments, body walls may be unevenly spaced, for instance wherein four walls form an X like shape having angles between walls of less than and greater than 90 degrees.

A feedback flow path may be positioned about 90 degrees from an adjacent feedback flow path. In some embodiments, a feedback flow path may be positioned less than or greater than about 90 degrees from an adjacent feedback flow path. In some embodiments, a pair of feedback flow paths may be positioned about 180 degrees apart. A positioning of feedback flow paths may be symmetrical or nonsymmetrical.

In some embodiments, a fluidic oscillator comprises a conduit coupled to the body at an upstream end of the body. The conduit may be in flow communication with a body inlet. In some embodiments, a conduit may have a substantially cylinder-shaped bore. In some embodiments, an oscillator body and conduit may be a unitary construct. In other embodiments, an oscillator body and conduit may be formed separately and coupled together. The fluidic oscillators may have no moving parts.

In some embodiments, a conduit bore may share an axis with a central body bore. In other embodiments, a conduit bore may be positioned at an angle, for example from about 30 degrees to about 90 degrees or more, relative to a body fluid inlet.

In some embodiments, a fluidic oscillator may comprise a planar face at a downstream end. A planar face may be flush with the oscillator outlet. In other embodiments, an outlet may extend beyond a downstream body face. In some embodiments, an oscillator outlet may have outwardly flared walls. In some embodiments, a fluid inlet may be inwardly tapered. A fluid inlet may be symmetrically inwardly tapered or non-symmetrically inwardly tapered; "inwardly tapered" meaning a decreasing internal diameter from upstream to downstream.

Plumbing fixtures, for instance shower heads, faucets, body jet nozzles for walk-in bath tubs, etc. may comprise one or more present fluidic oscillators. Present plumbing fixtures may be configured to provide an effective and pleasant water stream while at the same time consuming less water. A plurality of fluidic oscillators may be positioned in a symmetrical pattern, or may be positioned non-symmetrically in or on a plumbing fixture. A plurality of fluidic oscillators may be oriented randomly, or may be oriented in a certain pattern in respect to oscillator walls or fins. For example, fluidic oscillators having walls or fins, may have the walls or fins oriented randomly or in a regular pattern. In an embodiment, a plurality of fluidic oscillators may be positioned symmetrically in or on a plumbing fixture and have oscillator walls or fins oriented in a regular pattern or randomly.

The fluidic oscillators may be configured to be coupled to a pressurized fluid source. Upon a pressurized fluid source being introduced into the fluidic oscillator, fluid will exit in an oscillating manner. Fluid may oscillate throughout x-y and x-z planes from a center axis.

In some embodiments, fluidic oscillators may comprise one or more thermoplastic polymers, for example one or more of polyolefins, polyamides, polyesters, polystyrenes, mixtures thereof or copolymers thereof.

In some embodiments, fluidic oscillators may be prepared via thermoplastic molding techniques, including injection molding, rotomolding, or 3D printing.

Fluidic oscillators described herein are not limited to use in plumbing fixtures. In some embodiments, present fluidic oscillators may be employed in any desired fluid delivery system, for instance, in fuel injectors, windshield wiper fluid nozzles, sprinkler systems, fire extinguisher nozzles, and the like. Present fluidic oscillators may also be suitable for delivering oscillating gas streams.

In some embodiments, disclosed is a passively controlled 3D fluidic oscillator, comprising an oscillator body comprising an exterior surface; an interior surface defining a three-dimensional space therein; a fluid inlet; and a fluid outlet, wherein the three-dimensional space, the fluid inlet, and the fluid outlet are in flow communication, the three-dimensional space comprises a first fluid interaction region fluidly coupled to a first pair of feedback flow paths, and a second fluid interaction region fluidly coupled to a second pair of feedback flow paths, and wherein the first and second fluid interaction regions intersect causing 3D oscillations of a fluid spray as it exits the fluid outlet. In some embodiments, "passive" means having no moving parts.

Following are some non-limiting embodiments of the disclosure.

In a first embodiment, disclosed is a fluidic oscillator, the fluidic oscillator comprising an oscillator body comprising an exterior surface; an interior surface defining a three-dimensional space therein; a fluid inlet; and a fluid outlet, wherein the three-dimensional space, the fluid inlet, and the fluid outlet are in flow communication, the three-dimensional space comprises a first fluid interaction region fluidly coupled to a first pair of feedback flow paths, and a second fluid interaction region fluidly coupled to a second pair of feedback flow paths, and wherein the first and second fluid interaction regions intersect, providing fluid communication throughout the three-dimensional space.

In a second embodiment, disclosed is a fluidic oscillator according to the first embodiment, wherein the body comprises a planar face and wherein the fluid outlet is flush with the planar face. In a third embodiment, disclosed is a fluidic oscillator according to the first or second embodiments, wherein the outlet comprises outwardly flared walls.

In a fourth embodiment, disclosed is a fluidic oscillator according to any of the preceding embodiments, wherein the body exterior surface comprises exterior walls (or fins). In a fifth embodiment, disclosed is a fluidic oscillator according to any of the preceding embodiments, wherein the body exterior surface comprises exterior walls, and wherein an angle between adjacent exterior walls is about 90 degrees. In a sixth embodiment, disclosed is a fluidic oscillator according to any of the preceding embodiments, wherein the body exterior surface comprises exterior walls, and wherein an angle between adjacent exterior walls is less than or greater than 90 degrees.

In a seventh embodiment, disclosed is a fluidic oscillator according to any of the preceding embodiments, comprising a conduit coupled to and in flow communication with the fluid inlet. In an eighth embodiment, disclosed is a fluidic oscillator according to the seventh embodiment, wherein the conduit comprises a substantially cylinder-shaped bore. In a ninth embodiment, disclosed is a fluidic oscillator according to embodiments 7 or 8, wherein the oscillator body and conduit are a unitary construct.

In a tenth embodiment, disclosed is a fluidic oscillator according to any of the preceding embodiments, wherein the fluid inlet is inwardly tapered from upstream to downstream.

In an eleventh embodiment, disclosed is a fluidic oscillator according to any of the preceding embodiments, wherein the three-dimensional space comprises a fluid pathway from inlet to outlet, the fluid pathway formed by the intersection of the first and second fluid interaction regions. In a twelfth embodiment, disclosed is a fluidic oscillator according to the eleventh embodiment, wherein the fluid pathway formed by the intersection is substantially cylinder-shaped.

In a thirteenth embodiment, disclosed is a fluidic oscillator according to any of the preceding embodiments, wherein each feedback flow path is positioned about 90 degrees from an adjacent feedback flow path.

In a fourteenth embodiment, disclosed is a fluidic oscillator according to any of the preceding embodiments, comprising no moving parts. In a fifteenth embodiment, disclosed is a fluidic oscillator according to any of the preceding embodiments, wherein the fluidic oscillator is a passive 3D oscillator.

In a sixteenth embodiment, disclosed is a fluidic oscillator according to any of the preceding embodiments, wherein the intersection of the first and second fluid interaction areas provides a central body bore.

In a seventeenth embodiment, disclosed is a plumbing fixture comprising one or more fluidic oscillators according to any of the preceding embodiments. In an eighteenth embodiment, disclosed is a plumbing fixture according to the seventeenth embodiment selected from a shower head or a faucet spray head. In a nineteenth embodiment, disclosed is a plumbing fixture according to embodiments 17 or 18 comprising a plurality of fluidic oscillators.

In a twentieth embodiment, disclosed is a plumbing fixture according to any of embodiments 17 to 19, wherein the fluidic oscillators are oriented randomly with respect to oscillator body walls. In a twenty-first embodiment, disclosed is a plumbing fixture according to any of embodiments 17 to 19, wherein the fluidic oscillators are oriented in a pattern with respect to oscillator body walls. In a twenty-second embodiment, disclosed is a plumbing fixture according to any of embodiments 17 to 21, wherein the fluidic oscillators are positioned in a symmetrical pattern in or on the fixture.

The term "adjacent" may mean "near" or "close-by" or "next to".

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "flow communication" means for example configured for liquid or gas flow there through and may be synonymous with "fluidly coupled". The terms "upstream" and "downstream" indicate a direction of gas or fluid flow, that is, gas or fluid will flow from upstream to downstream.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

Example 1 Shampoo Removal Test

In the following tests, a test wig is treated with 25 mL of shampoo. The shampoo-treated wig is rinsed with water from a shower head comprising a plurality of present fluidic oscillators (A) and commercial shower heads (B) and (C). Rinse water samples are taken at 5 seconds and at 10 second intervals thereafter. Rinse water samples are tested for turbidity, reported below as Nephelometric Turbidity Units (NTU). Lower NTU corresponds to more clear samples. A distance of a shower head from the wig is about 190 mm. A water flow rate is maintained at 1.45 gallons per minute. Water temperature is held constant with a thermostatic valve and water pressure is regulated on both hot and cold lines independently to achieve desired flow rate.

| | Turbidity (NTU) | | |
|---|---|---|---|
| Time (sec) | (A) | (B) | (C) |
| 0 | 0 | 0 | 0 |
| 5 | 806 | 303 | 145 |
| 10 | 734 | 275 | 248 |
| 20 | 286 | 172 | 229 |
| 30 | 116 | 102 | 182 |
| 40 | 53 | 75 | 134 |
| 50 | 22 | 49 | 98 |
| 60 | 11 | 32 | 82 |
| 70 | 6 | 24 | 72 |
| 80 | 4 | 19 | 61 |
| 90 | 3 | 18 | 40 |
| 100 | 1 | 16 | 27 |
| 110 | 1 | 11 | 21 |
| 120 | 1 | 8 | 15 |

The results indicate that present shower head (A) rinses shampoo from the wig at a greater rate than commercial shower heads (B) and (C), as shown by higher turbidity values for rinse water samples taken early on at 5 seconds, 10 seconds, and 20 seconds. Thereafter, desired low turbidity values are obtained for rinse water samples collected from a wig rinsed with shower head (A) earlier than from a wig rinsed with commercial shower heads (B) and (C). Rinse water samples taken at 70 seconds show an NTU of less than 10 for the present shower head (A). Commercial shower head (B) does not provide a rinse water NTU of less than 10 until 120 seconds. Commercial shower head (C) does not provide a rinse water NTU of less than 10 even up to 120 seconds.

Example 2 Almond Butter Removal Test

Figure 3:
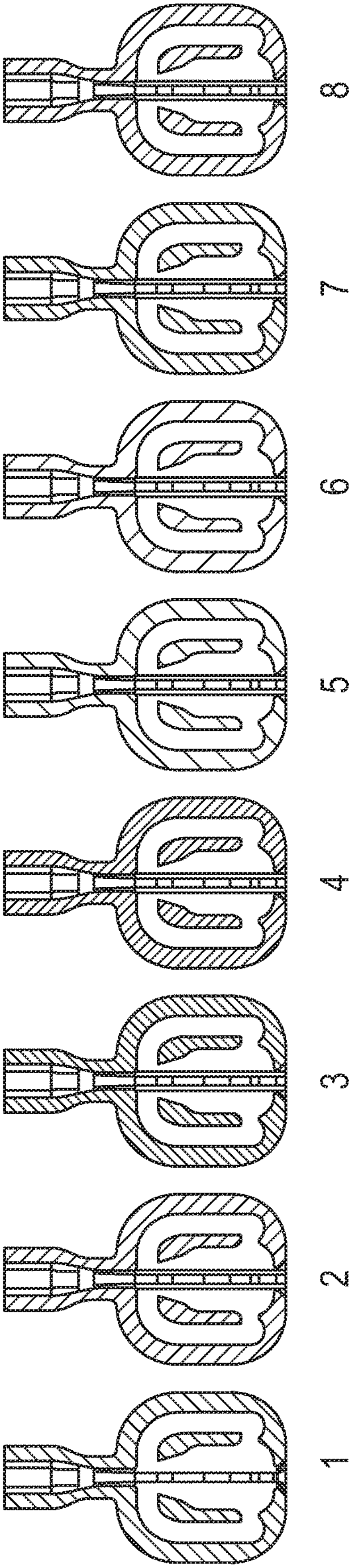
FIG. 3 provides cross-section views of fluidic oscillators 1-8 of Example 2, according to some embodiments.

A series of 8 fluidic oscillators having a same/similar external size and shape, and having differing internal cavity shapes which drive the amplitude and frequency of fluid oscillations are prepared via 3D printing. Cross-section views of fluidic oscillators 1-8 are shown in FIG. 3. Eight faucet assemblies are prepared having three fluidic oscillators of one of samples 1-8, respectively. A 32 g sample of almond butter, about 3 inches in diameter and about 4 mm thick, is applied to a ceramic plate at the plate center. Cold tap water is sprayed at the almond butter at a 30 degree angle from vertical at a flow rate of 1.1 gal per minute. A time taken to completely remove the almond butter is measured. The time varied from 14 seconds to 27 seconds for the eight different assemblies.

The invention claimed is:

1. A fluidic oscillator, comprising
an oscillator body comprising
an exterior surface;
an interior surface defining a three-dimensional space therein;
a fluid inlet; and
a fluid outlet,
wherein
the three-dimensional space, the fluid inlet, and the fluid outlet are in flow communication,
the three-dimensional space consists of a fluid pathway from the fluid inlet to the fluid outlet, a first fluid interaction region fluidly coupled to a first pair of feedback flow paths, and a second fluid interaction region fluidly coupled to a second pair of feedback flow paths,
the first and second fluid interaction regions intersect, and
the fluid pathway is defined by the intersection of the first and second fluid interaction regions.

2. The fluidic oscillator according to claim 1, wherein the body comprises a planar face and wherein the fluid outlet is flush with the planar face.

3. The fluidic oscillator according to claim 1, wherein the outlet comprises outwardly flared walls.

4. The fluidic oscillator according to claim 1, wherein the body exterior surface comprises exterior walls, and wherein an angle between adjacent exterior walls is 90 degrees.

5. The fluidic oscillator according to claim 1, wherein the body exterior surface comprises 4 exterior walls, each of the exterior walls comprising a feedback flow path.

6. The fluidic oscillator according to claim 1, comprising a conduit fluidly coupled to the fluid inlet.

7. The fluidic oscillator according to claim 6, wherein the conduit comprises a substantially cylinder-shaped bore.

8. The fluidic oscillator according to claim 6, wherein the oscillator body and conduit are a unitary construct.

9. The fluidic oscillator according to claim 1, wherein the fluid inlet is inwardly tapered.

10. The fluidic oscillator according to claim 1, wherein the first pair of feedback flow paths are positioned 180 degrees apart, and the second pair of feedback flow paths are positioned 180 degrees apart.

11. The fluidic oscillator according to claim 10, wherein the fluid pathway defined by the intersection is substantially cylinder-shaped.

12. The fluidic oscillator according to claim 1, wherein each feedback flow path is positioned 90 degrees from an adjacent feedback flow path.

13. The fluidic oscillator according to claim 1, comprising no moving parts.

14. The fluidic oscillator according to claim 1, wherein the intersection of the first and second fluid interaction regions defines a central body bore.

15. A plumbing fixture comprising one or more fluidic oscillators according to claim 1.

16. The plumbing fixture according to claim 15 comprising a plurality of fluidic oscillators.

17. The plumbing fixture according to claim 16, wherein the fluidic oscillators are oriented randomly with respect to oscillator body walls.

18. The plumbing fixture according to claim 16, wherein the fluidic oscillators are oriented in a pattern with respect to oscillator body walls.

19. The plumbing fixture according to claim 16, wherein the fluidic oscillators are positioned in a symmetrical pattern in or on the fixture.

20. The plumbing fixture according to claim 15, wherein the plumbing fixture is a shower head or faucet spray head.

* * * * *